UNITED STATES PATENT OFFICE.

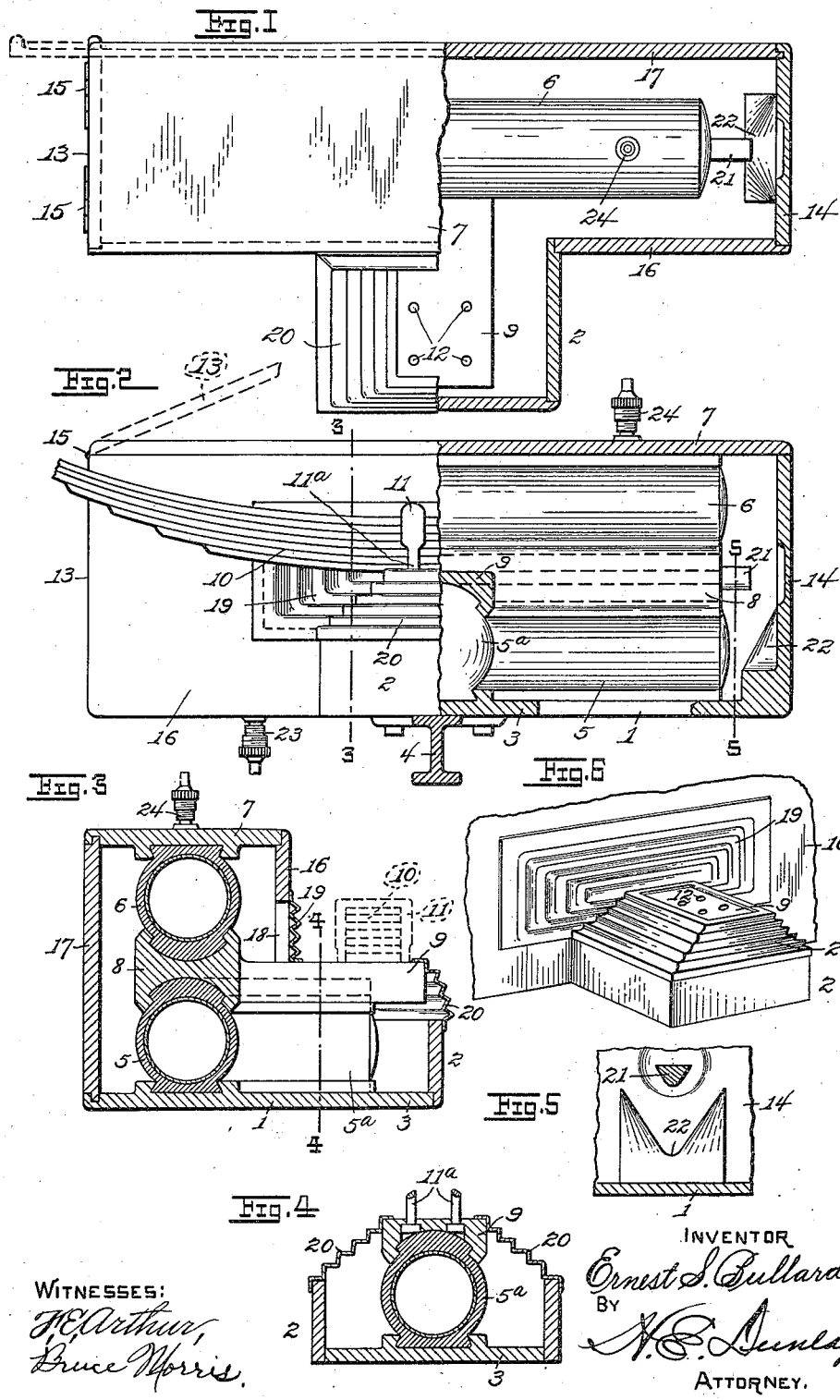

ERNEST S. BULLARD, OF WHEELING, WEST VIRGINIA.

SHOCK-ABSORBER.

1,033,870.

Specification of Letters Patent.

Patented July 30, 1912.

Application filed August 4, 1911. Serial No. 642,397.

*To all whom it may concern:*

Be it known that I, ERNEST S. BULLARD, a citizen of the United States of America, and resident of Wheeling, county of Ohio, and State of West Virginia, have invented certain new and useful Improvements in Shock-Absorbers, of which the following is a specification.

This invention relates broadly to shock-absorbers, and specifically to a shock-absorbing cushion for vehicles.

The primary object of the invention is to provide a flexible cushioning device whereby the vibration and jars incident to the travel of a vehicle running-gear over an uneven surface are absorbed and prevented from being imparted or communicated to the vehicle body.

A further object is to provide a device which will so minimize road shocks communicated to the body of a vehicle as to obviate the necessity for employing pneumatic tires on the wheels of a vehicle.

A further object within the contemplation of the invention is to provide a shock-absorbing device which minimizes not only the vibration and shocks of travel over uneven roads or surfaces, but also the sharp jerks due to sudden starting and stopping of a vehicle to which it is applied; and, further, which greatly reduces the shocks and strains of sidelashing; and still further wherein there is no rigid connection between the body and the running gear. And a still further object is to provide a shock absorbing device embodying yielding cushions whereby the necessity for the employment of rigid connections between the body and the running gear of a vehicle to which it is applied is obviated.

With these and other objects in view, the invention resides in the features of construction, arrangement of parts and combinations of elements which will hereinafter be exemplified, reference being herein had to the accompanying drawings, forming a part of this specification, in which—

Figure 1 is a view of my invention partly in top plan and partly in horizontal section; Fig. 2 is a view partly in side elevation and partly in vertical section; Fig. 3 is a transverse section on the line 3—3, Fig. 2; Fig. 4 is a section on the line 4—4, Fig. 3; Fig. 5 is a detail section on the line 5—5, Fig. 2; and Fig. 6 is a detail perspective view illustrating the bellows portion of the invention.

Referring to said drawings, in which like designating characters distinguish like parts throughout the several views—1 indicates the base member of a casing which may be of any appropriate form, but which is preferably substantially rectangular, with a laterally directed extension, designated generally by the numeral 2, located midway between the ends of the casing. A laterally-directed arm 3, integral with the base member 1, constitutes the base portion of said extension 2. Said base 1 is adapted to be mounted transversely of a vehicle axle, as shown at 4 in Fig. 2, with the base of the extension 2 resting upon said axle.

Mounted longitudinally upon the base 1 within the inclosure constituted by the casing is the body portion 5 of a tubular pneumatic cushion which has an integral laterally directed arm 5ª disposed centrally upon the base portion 3 of the extension 2. Any suitable means may be employed for maintaining the cushion in place upon the base, the means depicted consisting of interlocking dovetail portions carried by said cushion and by said base. A pneumatic cushion 6 is mounted in like manner on the under side of the top member 7 of the casing, preferably in vertical alinement with the pneumatic body 5, and interposed between the tubular cushions 5 and 6 and having interlocking engagement with both cushioning elements is a longitudinally extending bar 8 having an integral laterally directed arm 9 which overlies the arm 5ª of pneumatic cushion 5. Said arm 9 constitutes a mounting upon the top of which is fixed the usual vehicle spring 10, the latter being secured in position in any suitable manner, as by shackles 11 having their ends 11ª projected downward through holes 12 provided in said arm.

The casing comprises the base 1, end walls 13 and 14, the former of which is preferably hinged, as shown at 15 in Fig. 1, and the latter of which is fixed; a stationary rear wall 16, and a front wall 17, the latter being slidably mounted to allow withdrawal thereof to admit of ready access being had to the interior of the casing. In order to admit of vertical movement, or play, of the spring-supporting arm 9, an opening 18 of suitable size is provided in the rear wall 16. For preventing access of dust and other foreign matter through said opening 18, a flexible covering 19, preferably of bellows form, allowing a complete freedom of movement of said arm 9, is provided, said covering being attached to said wall 16 about said opening and to the adjacent part of said arm 9. For preventing access of dust and the like to the interior of the extension 2 and, at the same time, permitting of free movement of said arm 9, a bellows-like extensible covering 20 is connected to the upper edges of the walls of said extension and to the edges of said arm 9, as is clearly shown in the drawings.

A trunnion 21 is provided on each end of bar 8, as shown, said trunnions being adapted, when the cushion 5 is deflated, to rest on V-shaped seats 22 formed at the lower part of the inner face of each of the ends 13 and 14, the crushing of said cushion when deflated thus being prevented.

Valves 23 and 24 are provided at suitable points through which air pressure may be admitted to cushions 5 and 6, respectively, for inflating the latter when occasion requires.

As is obvious, the weight of the vehicle resting upon the spring 10 is borne by the arm 9 of bar 8 which rests upon the axle 4. Thus the said spring and the weight supported thereby is sustained by the tubular pneumatic cushion 5 and its arm 5ª. Vibration and road shocks must therefore be communicated to the body of the vehicle through said pneumatic cushion 5. A further absorption of vibrations and shocks occurs in the pneumatic cushion 6 which overlies the bar 8.

Shocks due to sidelashing, or lateral movement of the vehicle body with respect to the axles, are minimized by reason of the fact that such movement must produce a lateral or rolling movement of cushions 5 and 6, which movement is yieldingly resisted thereby. The shocks or jerks due to sudden starting or stopping are likewise minimized by reason of the fact that such act upon the pneumatic arm 5ª to produce a rolling movement of the latter, which movement is of a flexible yielding character.

While I have described my invention more or less in detail and in what I consider to be its simplest form, it is obvious that various slight changes within the skill of a mechanic and within the scope of the appended claims may be resorted to without departing from the general spirit or scope of the invention.

Having thus described my invention, what I claim as new, and desire to secure by Letters Patent, is—

1. A cushioning device of the character described comprising, in combination with a vehicle axle, a casing adapted for mounting on said axle, a pair of resilient cushion members mounted on the top and bottom of the casing, one above the other, a solid member interposed between said cushion members, an arm carried by said solid member and adapted to support the weight of a vehicle body thereon, and a laterally directed cushioning extension of one of said cushion members supporting said arm.

2. A cushioning device of the character described comprising, in combination with a vehicle body and an axle, a part adapted for mounting on said axle, a part supported above the first mentioned part, cushion members carried on the opposing faces of said parts, a solid member interposed between said cushions and having connection therewith, a laterally directed arm carried by said solid member and constituting a mounting for a portion of said body, a cushioning extension of one of said cushion members being disposed in underlying supporting relation to said arm, and an inclosure for said cushions, of which the cushion-supporting parts form elements.

3. A cushioning device of the character described comprising, in combination with a vehicle body and an axle, a part adapted for mounting on said axle, a part supported above the first mentioned part, pneumatic cushion members attached to the opposing faces of said parts, a solid member interposed between said cushions and having connection therewith, a laterally directed arm carried by said solid member and supporting a part of the vehicle body thereon, and a laterally directed arm-like extension of the lower of said cushion members disposed in supporting relation to the arm of said solid member.

4. A cushioning device of the character mentioned comprising, in combination with a vehicle body and a running gear, two separated pneumatic cushions arranged to coöperate for giving resiliency to said body, a member disposed between said cushions and having a laterally directed arm on which the weight of said body is sustained, and a cushion extension of one of said cushions disposed in supporting relation to said arm.

In testimony whereof I affix my signature in presence of two subscribing witnesses.

ERNEST S. BULLARD.

Witnesses:
ANTON BIEBERSON,
H. E. DUNLAP.